United States Patent [19]
Imler et al.

[11] Patent Number: 5,466,140
[45] Date of Patent: Nov. 14, 1995

[54] TIRE PRESS WITH IMPROVED SEGMENTED MOLD OPERATOR

[75] Inventors: Donald C. Imler, Volant, Pa.; Dirk A. Keller, Salem, Ohio

[73] Assignee: National Feedscrew & Machining Industries, Inc., Massillon, Ohio

[21] Appl. No.: 328,611

[22] Filed: Oct. 25, 1994

Related U.S. Application Data

[63] Continuation of Ser. No. 58,468, May 6, 1993, abandoned.

[51] Int. Cl.⁶ .................................................. B29D 30/06
[52] U.S. Cl. .................................. 425/38; 425/46; 425/48
[58] Field of Search .................................. 425/36, 38, 43, 425/46, 47, 48

[56] References Cited

U.S. PATENT DOCUMENTS

| | | | |
|---|---|---|---|
| 3,065,499 | 11/1962 | Brundage et al. | 425/32 |
| 3,097,394 | 7/1963 | Mallory et al. | 425/33 |
| 3,378,882 | 4/1968 | Turk et al. | 425/38 |
| 3,464,090 | 9/1969 | Cantarutti | 425/46 |
| 3,471,895 | 10/1969 | Ulm et al. | 425/38 |
| 3,487,507 | 1/1970 | Turk | 425/29 |
| 3,787,155 | 1/1974 | Zangl | 425/46 |
| 4,447,385 | 5/1984 | Blosser et al. | 425/38 |
| 4,608,219 | 8/1986 | Singh et al. | 425/38 |
| 4,686,129 | 8/1987 | Yokoyama et al. | 425/47 |
| 4,768,937 | 9/1988 | Singh | 425/36 |

Primary Examiner—James P. Mackey
Attorney, Agent, or Firm—Rankin, Hill, Lewis & Clark

[57] ABSTRACT

An operating mechanism for tire press that includes upper and lower sidewall molds and a segmented tread mold assembly for forming the tread portion of a tire. The sidewall molds and tread mold assembly define a molding cavity with a central vertical axis. The press may be operated to move the upper sidewall mold together with the tread mold assembly upwardly and laterally away from the vertical axis to permit loading of an uncured tire carcass in the lower sidewall mold section and for removing a cured tire from the upper sidewall mold section. The operating mechanism or center mechanism includes a bearing sleeve, coaxial with the central axis and mounted on the mold carrier beam for the press. An outer tubular sleeve is slidably received in the bearing sleeve and extends there-through so that the lower end may be operatively connected to the tread mold assembly for operating the same. The upper end of the outer sleeve is connected to a crosshead which is operated for linear travel by means of fluid cylinders mounted on the carrier beam at symmetrically spaced positions relative to the central axis. Slidably located within the outer sleeve is an inner sleeve that extends therethrough. The lower end of the inner sleeve may be used as a ram to remove a forming bladder from the interior of a tire following its curing. The inner sleeve is reciprocated by two or more fluid cylinders mounted on the crosshead symmetrically spaced about the central axis and with their piston rods secured to a connecting member which, in turn, is connected to the inner sleeve.

8 Claims, 8 Drawing Sheets

TIRE PRESS WITH IMPROVED SEGMENTED MOLD OPERATOR

This is a continuation of application Ser. No. 08/058,468, filed May 6, 1993, now abandoned.

BACKGROUND OF THE INVENTION

1. Field of the Invention

This invention relates to tire curing presses, and especially presses generally referred to as the slide-back type wherein the upper sidewall mold is raised upwardly and then carried horizontally away from the axis of the lower sidewall mold to facilitate loading of a new uncured tire carcass and removal of the cured tire. More particularly, the invention relates to a center mechanism for a tire press of the type described, that is used to perform several functions during the molding process including the opening and closing of a segmented tread mold assembly, the removal of the deflated forming bladder from the tire carcass and the operation of a chuck used to strip a cured tire from the lower sidewall mold and eject it from the upper sidewall mold when it is displaced laterally from the mold axis.

2. Description of the Prior Art

In automatic tire presses, such as those used in the manufacture of radial cord tires, a torroidal uncured tire carcass is loaded in a bottom mold section when the press is open and the top mold section then closes on top, while at the same time, a segmented tread mold assembly is moved to a closed position to provide the tread forming portion of the mold. Then a forming bag or bladder is inflated within the carcass prior to the closing the press to assist in shaping the tire during the curing process.

In automatic tire presses generally referred to as slideback presses, the top mold section moves directly upward after the curing operation and then laterally away from the bottom mold section. This positions the shaped tire at a location where it may be stripped from the top mold section and dropped on a conveyor, or the like.

In this type of press, it is necessary that certain operating equipment be carried on the movable beam that carries the upper mold section, or as is usually the case, a pair of upper mold sections. These mechanisms must accomplish several functions to include operating the segmented tread forming mold sections, forcing the forming bladder, once the cure is accomplished, out of the interior of the cured tire and into a retainer well generally located in the middle of the lower sidewall forming mold section, and operating a clutch mechanism that expands into a position where it may engage the tire beads to retain the tire in the upper mold section during its removal from the lower mold section.

In the past, a ram/ejector mechanism has been located centrally and has been adapted for reciprocating vertical movement along the central axis of the mold cavity. However, the mechanism for operating the segmented mold sections has included a plurality of fluid cylinders spaced radially outwardly from the ram/ejector mechanism. This has caused certain problems. In particular, it is difficult to synchronize two or more fluid cylinders that support the segmented mold operating mechanism and uneven pressures can often cause binding and subsequent malfunction.

The center mechanism of the present invention, however, enables all of these operating functions to be achieved utilizing elements which have guided movement through tubular members located concentrically about the axis of the molding cavity.

SUMMARY OF THE INVENTION

It is among the objects of the present invention to provide an improved center mechanism for a tire forming press.

Another object is to provide an improved segmented mold operating mechanism for a tire forming press.

Still another object is to reduce the difficulties encountered in operating a segmented tread mold operating wedge ring by means of a plurality of fluid cylinders symmetrically spaced about the axis of the mold cavity.

These and other objects and advantages are achieved with the unique tire press center assembly of the present invention. The basic elements of the press in which the center mechanism is used, include a lower sidewall mold, an upper sidewall mold and an expansible, contractible, segmented tread mold assembly. These elements when assembled for curing, define a molding cavity with a central, vertical axis. The upper sidewall mold is carried by a cross-beam along with the tread mold assembly. The cross-beam is adapted for movement after the curing process, vertically upward and then horizontally away from the axis of the mold cavity. The press also has an axial bladder well located below the lower sidewall mold and an inflatable forming bladder that is adapted for movement between an inflated condition within a tire carcass positioned in the mold for curing, and a deflated condition where it is retracted and collapsed into the bladder well.

In accordance with the invention, there is provided a center mechanism carried by the cross-beam along with the upper sidewall mold and including a plurality of first fluid cylinder and piston units located symmetrically about the vertical axis, a first cross-head connected to the lower ends of the pistons, a first tubular sleeve concentric with the axis and connected at one end to the cross-head and slidably received in a fixed bearing sleeve. The tubular operating sleeve is connected at the other end to a wedge plate that is adapted to move the radial sections of the segmented tread mold assembly radially inward into a molding position.

Also, included in the center assembly is a ram/ejector assembly including a second plurality of parallel fluid cylinder and piston devices mounted on said first cross-head and symmetrically spaced about the axis. The lower ends of the pistons are connected to a second cross-head which is connected to a second tubular sleeve, slidably received concentrically within the first tubular sleeve and adapted for vertical movement therein between a retracted position where the lower end thereof is above the inflated bladder and an extended position wherein the lower end thereof engages the bladder and pushes it into the bladder well.

A chuck assembly is adapted to be positioned adjacent to the upper beads of a tire located within the molding cavity. The chuck assembly includes radially movable arms that are operated by means of a plunger connected to the end of a central fluid cylinder and piston device that is adapted to move the plunger between a retracted position wherein the chuck is contracted and a downward extended position which moves the chuck so as to extend the arms to define a circle with a greater diameter than the tire bead diameter.

DESCRIPTION OF THE PREFERRED EMBODIMENT

Figure 1:
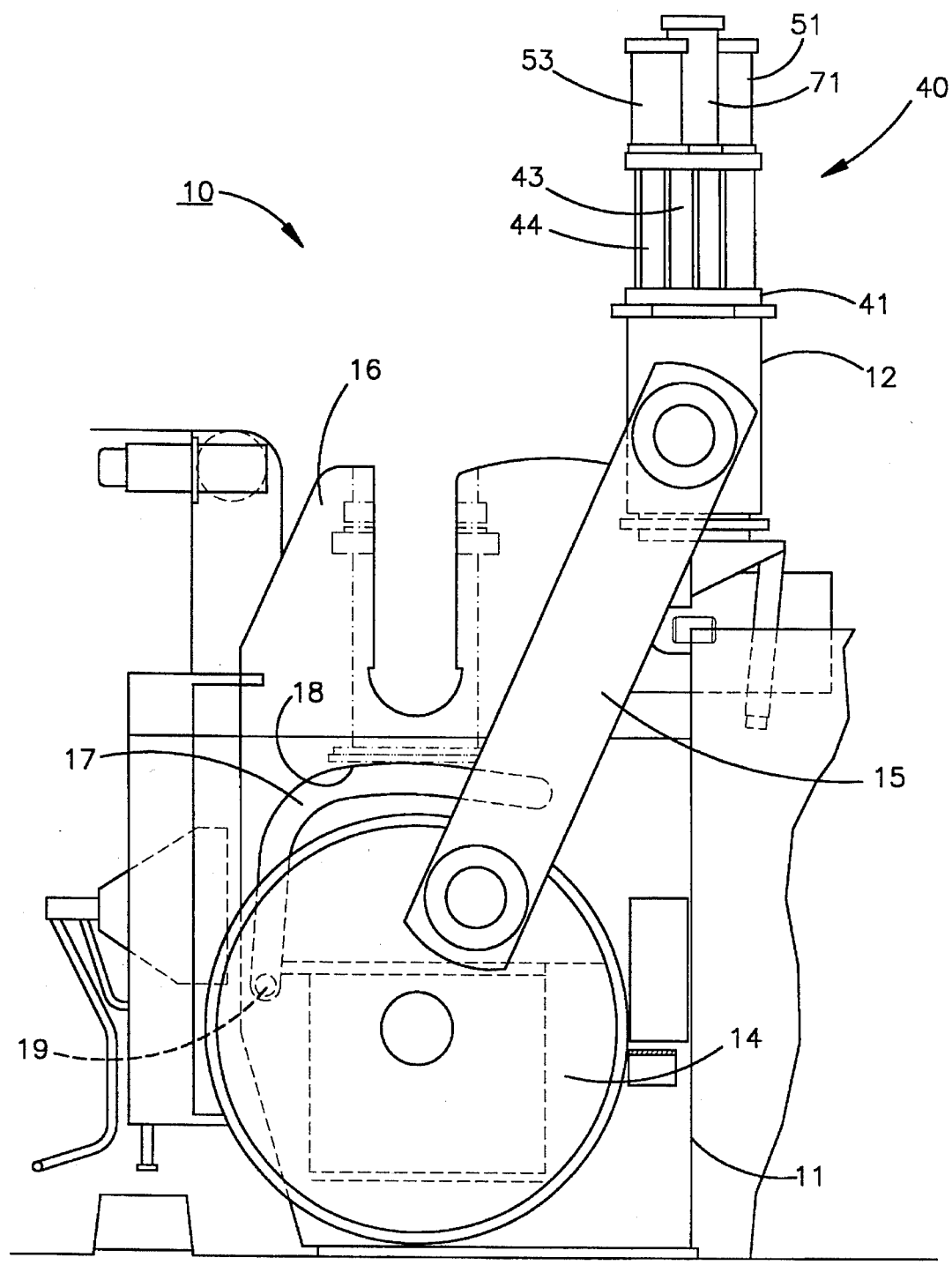
FIG. 1 is a side elevation of a dual, slide-back type tire press having a center mechanism embodying the invention.
Figure 2:
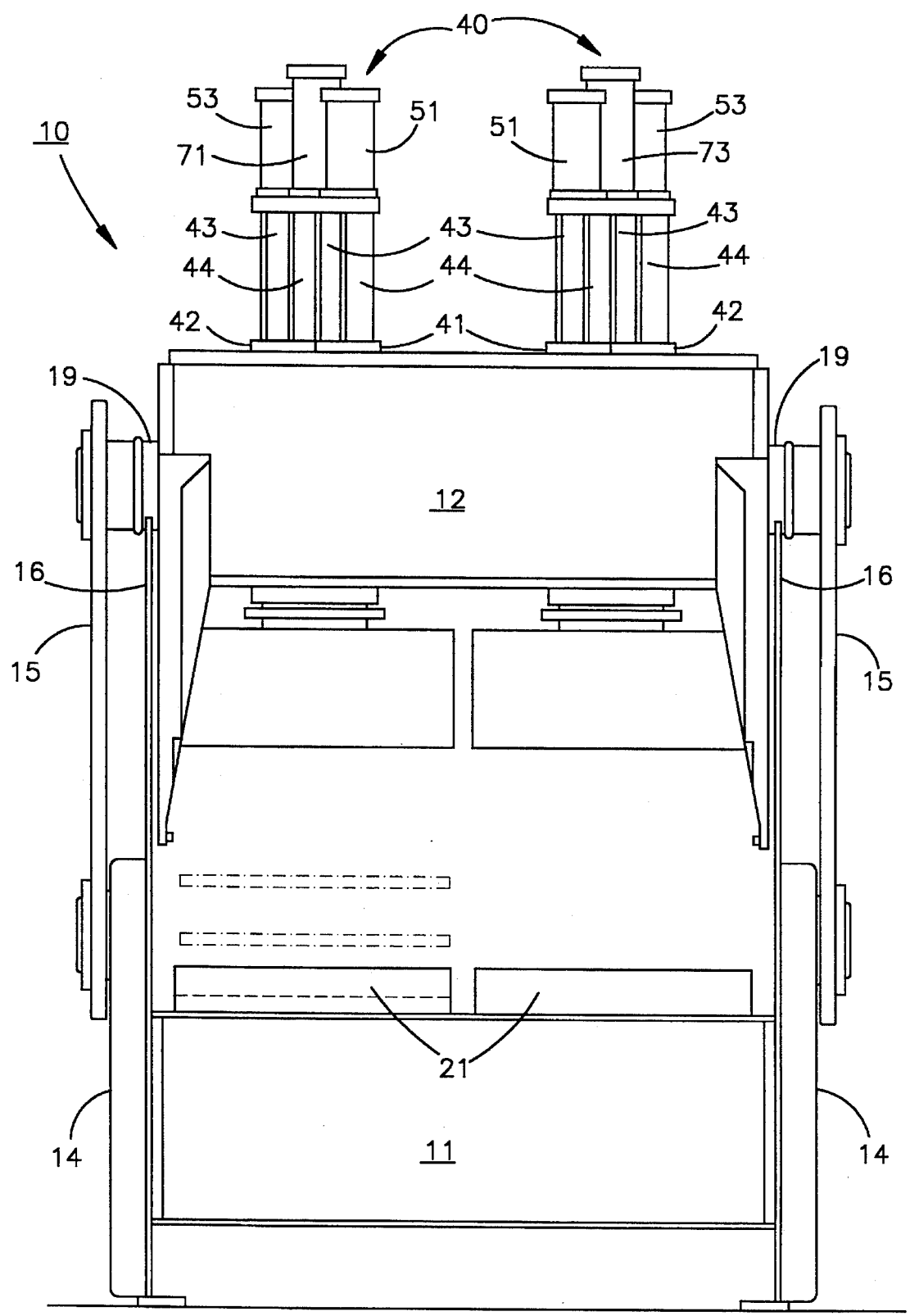
FIG. 2 is a front elevation with parts broken away of the dual, slide-back type tire curing press of FIG. 1.
Figure 3:
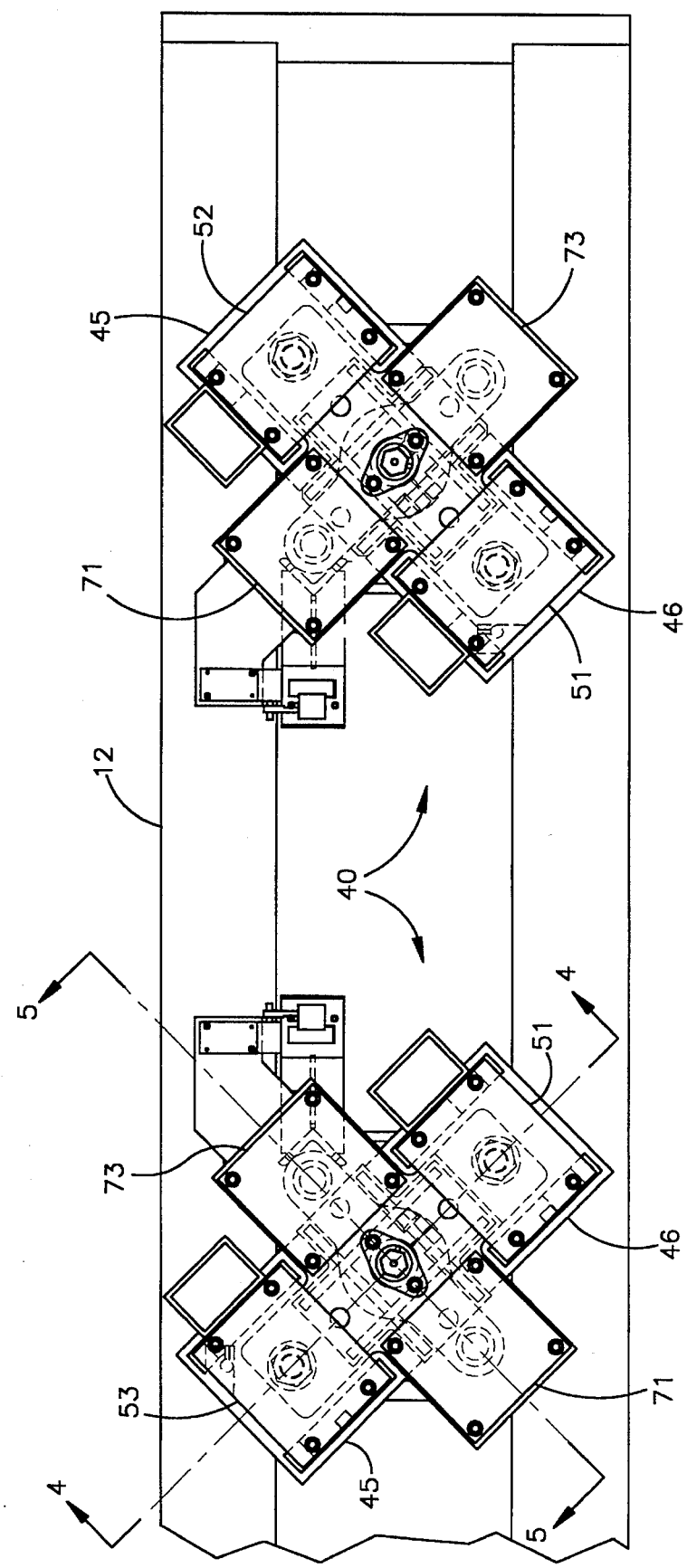
FIG. 3 is a fragmentary plan view of the cross-beam.

Referring more particularly to the drawings and initially to FIGS. 1 and 2, there is shown a dual slide-back-type tire press 10 adapted for use in curing radial tires. More particularly, the press 10 is a type that utilizes segmented tread molding sections capable of moving radially between an inwardly extended position wherein they define the tread portion of the tire. These radial sections, along with an upper sidewall mold section and a lower sidewall mold section, define a tire curing cavity having a vertical axis.

The press 10 is adapted to receive a raw uncured tire carcass 20 that has been built in a torroidal form as is standard practice in the production of radial cord vehicle tires. The raw uncured tire is initially positioned in a lower sidewall mold section and an upper mold section is lowered into a position, while at the same time, the segmented tread mold sections are moved radially inward to define a curing cavity. Then a forming bladder is inflated inside the torroidal tire carcass 20 to shape the tire and to correctly position the carcass on the lower mold section. The mold is then closed, and the tire curing operations begins.

After the tire is cured, the upper sidewall mold section is moved vertically upward, the segmented tread molding sections are retracted radially outward and the tire is stripped from the lower sidewall mold section and carried away while still in the upper sidewall mold section, to a position where it is ejected onto a conveyor or the like.

General Arrangement

Referring to FIGS. 1 and 2, the press 10 has a base 11, a cross-beam 12 that spans from one side of the press to the other and a pair of crank wheels 14 mounted on opposite sides thereof. Each crank wheel 14 carries a link 15 that is connected at its other end to an end of the cross-beam 12.

A pair of vertical side plates 16 are located on opposite sides of the press and each defines a curved slot 17 which forms a cam surface 18. A cam follower 19 connected to each end of the cross-beam 12 moves within one of the slots 17 and guides the movement of the cross-beam through a vertical path of travel as it moves into and out of molding position and for generally horizontal travel away from the axis of the mold cavity to a position where a cured tire may be ejected onto a conveyor or the like.

This type of tire press is often referred to as a slide-back vulcanizer of the type manufactured and sold by Rogers Industrial Products, Inc. of Akron, Ohio, by Mitshubishi Heavy Industries America, Inc., Tire Machinery Division, of Akron, Ohio, and by McNeil & NRM, Inc. of Akron, Ohio. The general construction and operation of this type of press is shown and described, for example in U.S. Pat. Nos. 3,097,394 and 3,065,499.

While two tire curing mold assemblies are shown in FIGS. 1 and 2, they are essentially identical and this description will be limited to only one of the two assemblies. The assembly includes a lower sidewall mold section 21 mounted in a generally fixed condition on the base 11 and an upper sidewall mold section 22 mounted at the bottom of the cross-beam 12. The upper sidewall mold section 22 has associated therewith a segmented tread mold assembly 30 of the general type shown in U.S. Pat. No. 4,768,937.

When the lower sidewall mold section 21, the upper sidewall mold section 22 and the segmented tread mold assembly 30 are in their closed molding positions, they define a tire molding and curing cavity 26 (FIG. 4) with a central, vertical axis. Also formed around the vertical axis and within the base 11 is a bladder well 23 adapted to receive, when deflated, a forming bladder 24 which may be inflated and expanded inside the torroidal uncured tire carcass 20 when the carcass is in the mold cavity 26. The forming bladder 24 has an annular bead ring 25 which is retained at the top of the well.

The forming bladder 24 is adapted, when inflated, to assume an oblate spheroidal shape within the uncured tire carcass 20, but is adapted when deflated, to be forced by a ram downwardly into the bladder well 23.

The segmented tread mold assembly 30 has a plurality of radial tread segments 31 located symmetrically about the central axis. The radial tread segments 31 are mounted on an actuator ring 32 for vertical movement from a radially outwardly retracted position to a radially inward closed forming position by engaging a wedge ring 33. The wedge ring 33 is mounted on a platen 34 which is moved vertically relative to the actuator ring 32 and the radial tread segments 31 by means of a center mechanism 40 embodying the present invention.

Center Mechanism

In accordance with the invention, there is provided a center mechanism 40 that includes a segmented mold operating mechanism 50 and a ram/ejector mechanism 70. The general function of these mechanisms is well known in the art and the present invention resides in the unique construction and assembly of these components.

Figure 6:
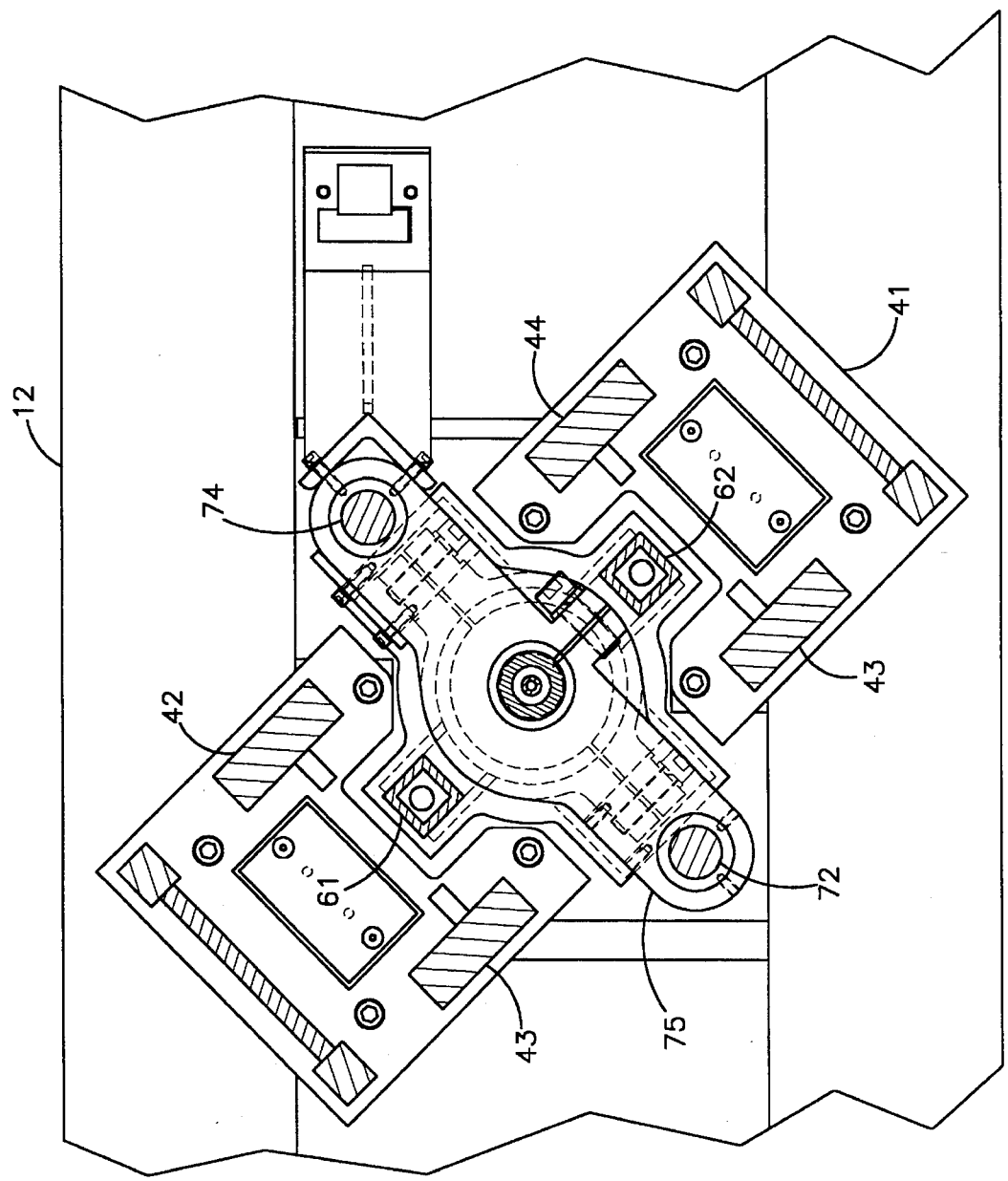
FIG. 6 is a fragmentary horizontal section taken on the line 6—6 of FIG. 4.

The center mechanism 40 includes a pair of mounting plates 41 and 42, secured, as indicated in FIG. 6, to the top of the cross-beam 12. Each of the mounting plates 41 and 42 has a pair of vertical posts 43 and 44 that extend upwardly in opposite orientation facing one another so that two pairs of vertical posts 43 and 44 are provided on opposite sides of the vertical axis.

Segmented Mold Operating Mechanism

In accordance with the present invention, the segmented mold operating mechanism 50 (FIG. 4) is provided with a pair of fluid cylinder/piston units including a fluid cylinder 51 and a piston 52 as well as a fluid cylinder 53 and associated piston 54. The fluid cylinders 51 and 53 are mounted to the vertical posts 43 and 44, respectively. The downwardly extending lower ends of the pistons 52 and 54 are secured to a cross-head 55 that extends through the vertical axis. A connecting member 56 is welded to the bottom of the cross-head 55 and the lower end, in turn, is welded to an annular plate 57. The plate 57 is bolted to another annular plate 58.

A pair of tubular, vertical connecting pillars 61 and 62 are welded to the bottom of the annular plate 58 and are symmetrically spaced on opposite sides of the vertical axis. The pillars 61 and 62 are welded at the bottom to a carrier plate 63 which is bolted to a second plate 64 which is, in turn, welded to an outer tube 66 extending downwardly therefrom. The lower end of the outer tube 66 is connected to a vertically adjustable bearing sleeve 67 which is located outside the tube 66 and adapted for vertical adjustment through a threaded engagement within a larger sleeve 68 that is mounted at the bottom of the cross-beam 12.

The bearing sleeve 67 is connected to the platen 234 which supports the wedge ring 33. The outer tube 66 is connected to the actuator ring 32 which supports the radial tread segments 31. Vertical movement of the bearing sleeve 67 relative to the outer tube 66 produces vertical movement of the wedge ring 33 relative to radial tread segments 31 and horizontally moves the radial tread segments radially inwardly and outwardly.

Ram/Ejector Mechanism

The ram/ejector mechanism 70 is carried in piggyback fashion on the segmented mold operating mechanism 50 so that in the absence of its own independent movement, it is carried through the same vertical path of travel as the segmented mold operating mechanism.

Figure 5:
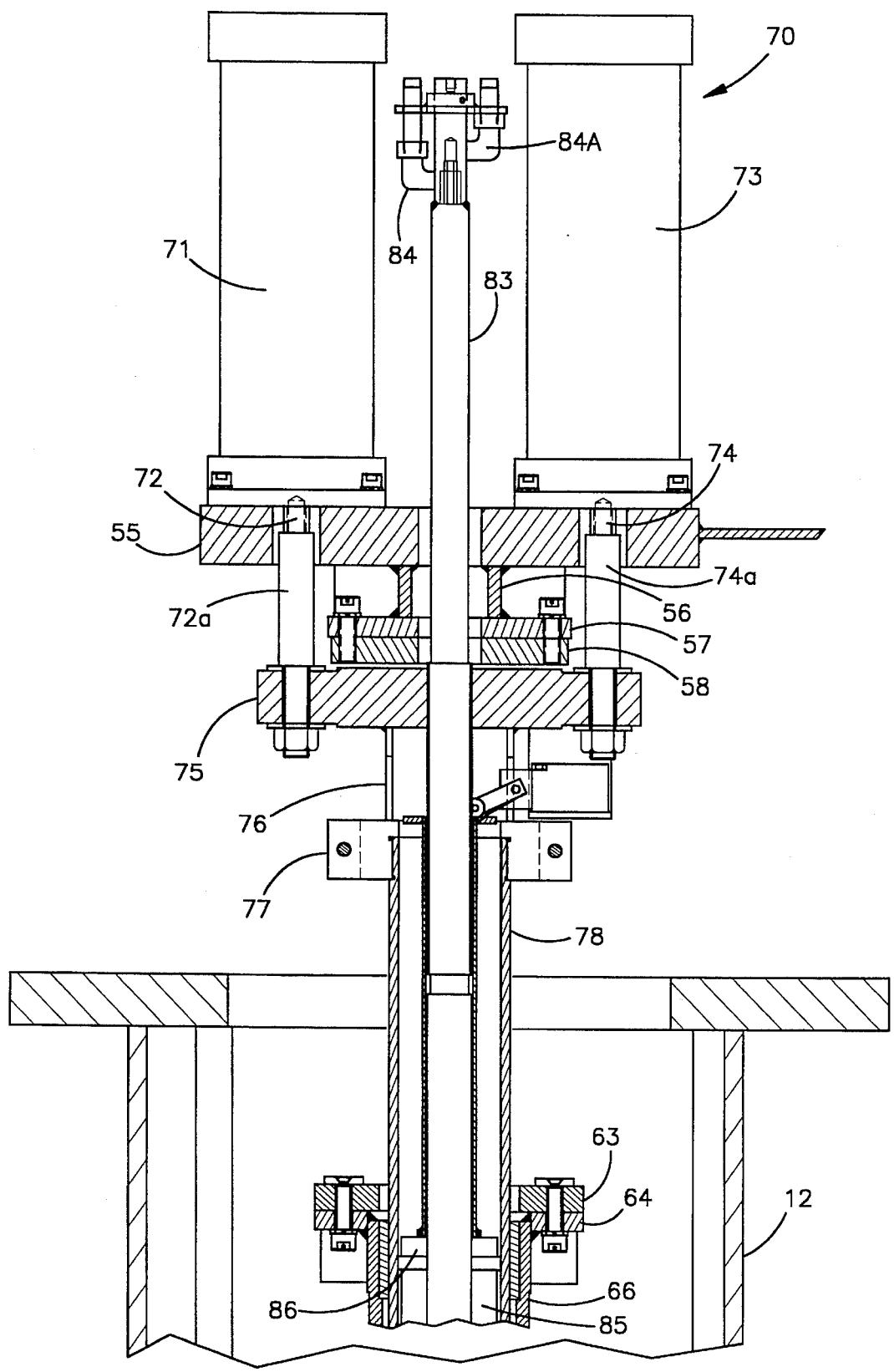
FIG. 5 is a fragmentary vertical section on an enlarged scale taken on the line 5—5 of FIG. 3.

The ram/ejector mechanism 70 (FIG. 5) includes a pair of ejector cylinder/piston units including a fluid cylinder 71 with a piston rod 72 and a fluid cylinder 73 with a piston rod 74. Attached to the ends of the piston rods 72 and 74 are rod extensions 72a and 74a. The fluid cylinders 71 and 73 are mounted symmetrically on opposite sides of the vertical axis on the cross-head 55 of the segmented mold operating mechanism 50. Accordingly, they are carried along with the cross-head 55 and the various components that are supported for reciprocating movement below it.

Figure 7:
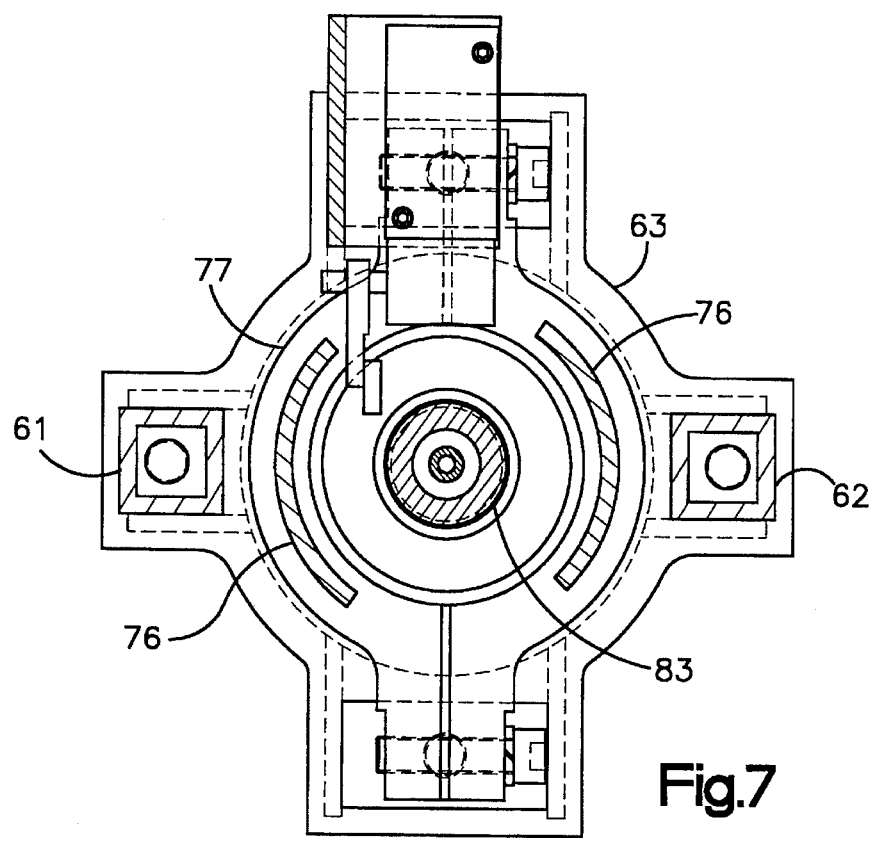
FIG. 7 is a horizontal section on an enlarged scale taken on the line 7—7 of FIG. 4.
Figure 8:
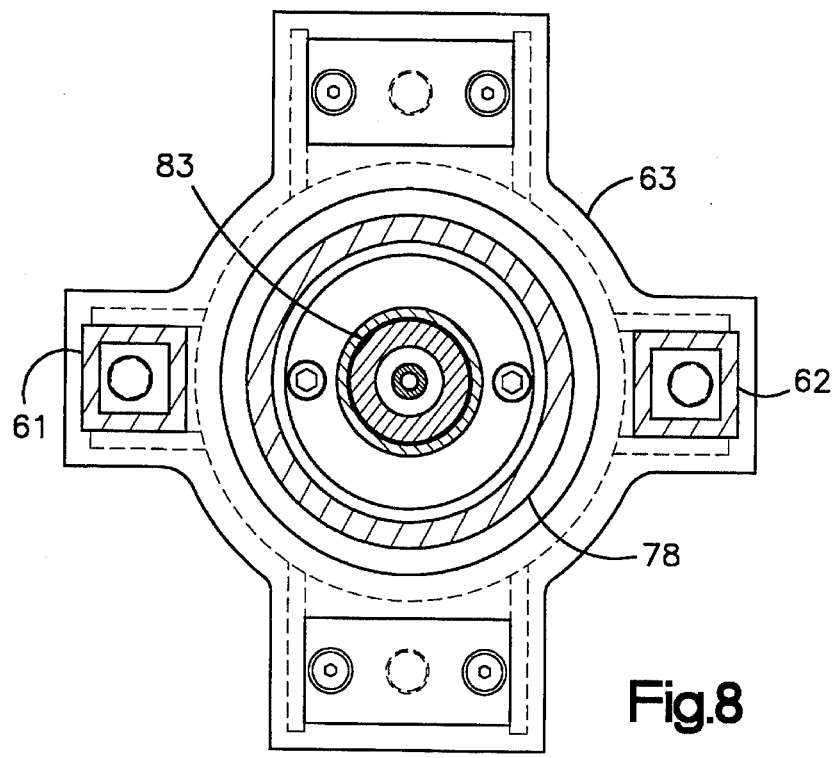
FIG. 8 is a horizontal section on an enlarged scale taken on the line 8—8 of FIG. 4.

A cross-head 75 (FIGS. 5 and 6) is connected to the lower ends of the piston rod extensions 72a and 74a, and extends through the central axis between the two pillars 61 and 62. A relatively short slotted sleeve 76 is welded to the bottom of the cross-head 75 and is connected at its lower end to an annular plate 77 (FIG. 7).

Another sleeve 78 is threaded to the bottom of the annular plate 77 and extends downwardly through the outer tube 66 of the segmented mold operating mechanism 50. The sleeve 78 supports a chuck mechanism 80 of a type well-known in the art and which is shown and described, for example, in U.S. Pat. No. 3,487,507.

The chuck mechanism 80 includes a plurality of bell cranks 81 pivotally supported by the lower end of the sleeve 78 and having an inner arm provided with a cam roller. The other arms of the bell cranks operate radially moving chuck arms 82, which may be moved between a retracted position wherein they define a circle having a smaller diameter than the beads of the uncured tire carcass 20 and an extended position wherein they define a circle with a larger diameter than the beads. When extended, they may be used to engage the beads for retaining the tire in the upper mold to strip the cured tire from the upper sidewall mold section 22.

The bell cranks 81 are operated by means of a ram assembly that includes a tube 83. The tube 83 is a dual coaxial tube having two concentric air passages extending through it. The tube 83 has an air-fitting 84 at its upper end, connected to a source of fluid pressure, for supplying pressurized fluid to each of the two concentric air passages. A cylinder 85 is located concentrically within the sleeve 78. The cylinder 85 has an annular seal 86 at its upper end through which the tube 83 extends. At the lower end of the tube 83 is a piston 88 which has an axial port 87 so that air under pressure may be transmitted through the central air passage of the tube 83 into the cylinder chamber on the lower side of the piston 88 where it operates against the piston 88 to move the cylinder 85 downwardly with respect to the tube 83 and the piston 88. The portion of the tube 83 located within the cylinder also has radial ports 89 so that air under pressure may be transmitted through the outer concentric air passage of the tube 83 to the cylinder chamber on the upper side of the piston 88 where it operates against the piston to move the cylinder 85 upwardly with respect to the tube 83 and the piston 88.

The cylinder 85 extends downwardly to the chuck arms 82. The cylinder 85 has an annular groove 90 formed therein into which the bell crank arm rollers project. Accordingly, when the cylinder 85 is pressurized to force the cylinder downward relative to the piston 88, the bell cranks 81 pivot to move the chuck arms 82 radially outward. On the other hand, when the cylinder 85 is retracted, the annular groove 90 moves upwardly to pivot the bell cranks in a manner retracting the chuck arms 82.

The lower end of the cylinder 85 also forms the ram that is used to push the forming bladder 24 into the well 23, and further actuation of the cylinder 85 is used to actuate the ram. The nose of the ram is provided with a ball nose to assist in pushing the bladder 24 into the well 23.

Operation

The operation of the tire press center mechanism 40 will be described with respect to a complete tire curing cycle beginning with the upper sidewall mold section 22 in its slide-back tire discharge position shown in solid lines in FIG. 1. At that point, the upper sidewall mold section 22, the cross-beam 12 and the center mechanism 40 are clear of the lower sidewall mold section 21 to permit a raw, uncured tire carcass 20 to be placed thereon.

As to the center mechanism 40, the segmented mold operating mechanism 50 has its fluid cylinder/piston assemblies in the extended position so that the segmented tread mold assembly 30 is in its open or radially outward condition. Also, the ram cylinder 85 is fully retracted and the chuck mechanism 80 is in its retracted position with the chuck arms 82 radially inward to permit the chuck to clear the beads of the new uncured tire.

At this point, the crank wheels 14 are operated to move the cross-beam 12 laterally to a centered position guided by the cam surface 18. Then as the crank wheels continue to move, the cross-beam 12 is carried downwardly, guided movement of the cam followers 19 within the curved slots 17. This movement brings the upper sidewall mold section 22 into molding position relative to the lower sidewall mold section 21 and closes the press. At the same time, the fluid cylinders 51 and 53 are opened to allow fluid to escape from the cylinders and allow the segmented mold tread assembly to the closed as the press closes by engagement of the radial tread segments 31 with the wedge ring 33. At this point, the sidewall mold sections 21 and 22 and segmented tread mold assembly 30 define a tire molding cavity 26 to properly form the tire during the curing operation.

Figure 4:
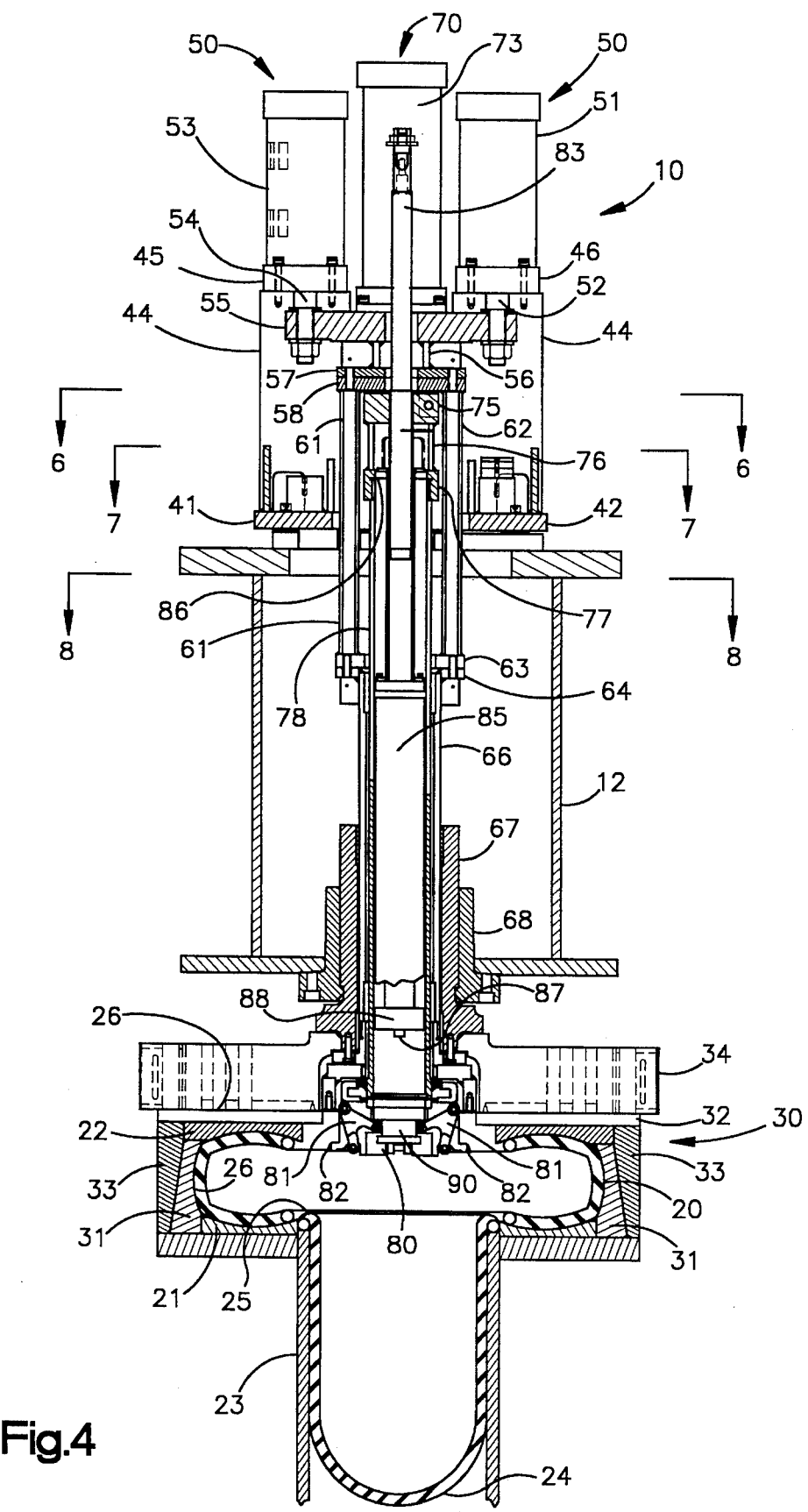
FIG. 4 is a vertical section on taken on the line 4—4 of FIG. 3 showing one of the center assemblies with the ram/ejector mechanism shown in its retracted condition.
Figure 4A:
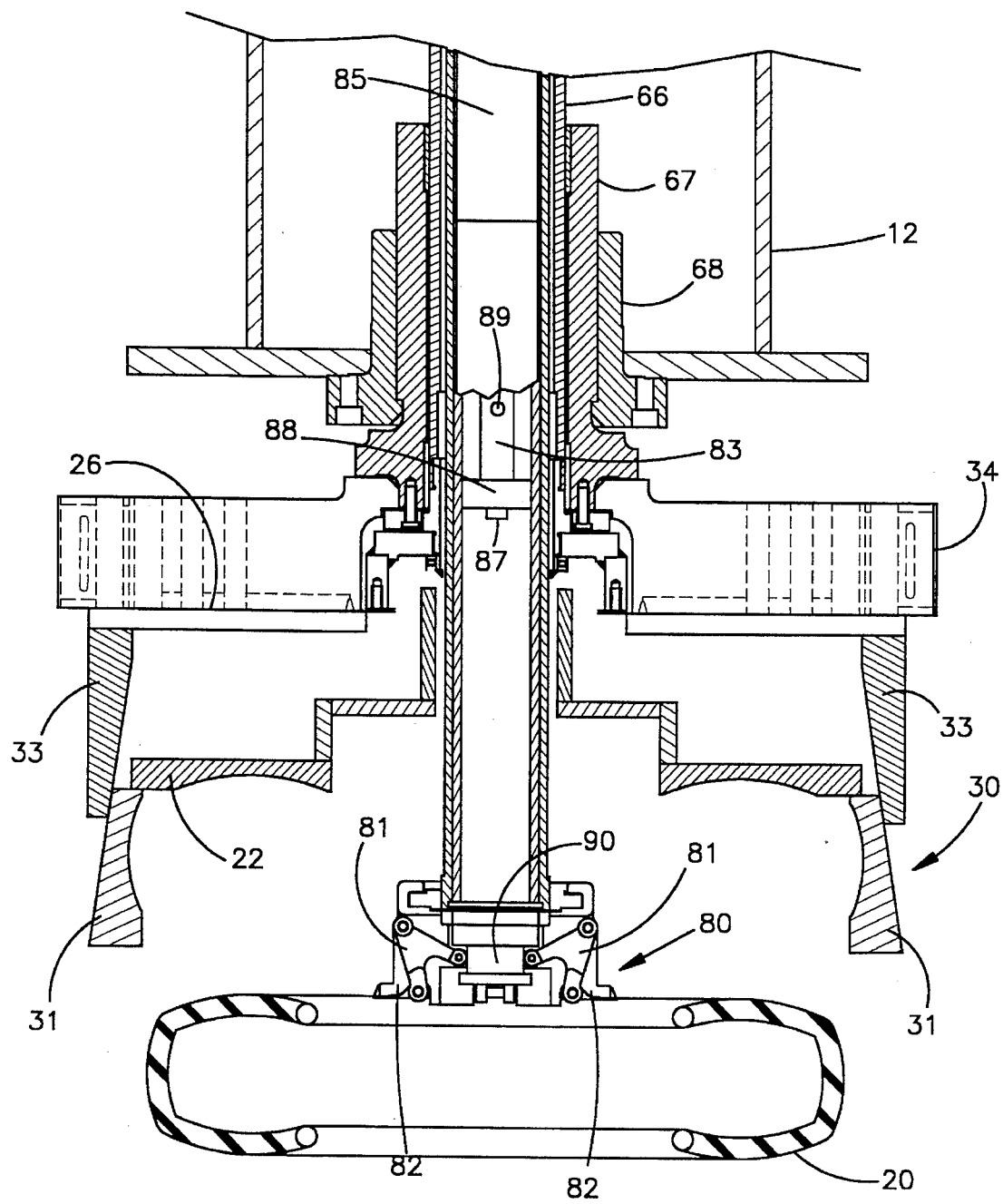
FIG. 4A is detailed vertical section similar to FIG. 4 showing the lower portion of the center assembly with the ram/ejector mechanism shown in its extended condition.

Before the press is closed and the molding cavity 26 is formed, the forming bladder 24 is inflated to force it upwardly and radially outwardly into the interior of the uncured tire carcass 20 to shape the tire. It will be noted that at this point, the chuck mechanism 80 is located in an axial position adjacent to the upper beads of the tire carcass 20 as shown in FIG. 4. Then the press is closed to form the molding cavity 26, and the time curing operation is performed.

Once the curing operation is completed, the forming bladder 24 is deflated, and the ram is extended downwardly by actuation of the fluid cylinder 85 to extend the cylinder 85 relative to the piston 88 Thus, the end of the ram nose engages the forming bladder 24 and forces it down into the bladder well 23. The actuation of the ram also causes the bell cranks 81 to pivot and extend the chuck arms 82 outwardly to define a diameter greater than the bead diameter.

After the ram has forced the forming bladder 24 into the well 23, the fluid cylinders 51 and 53 are actuated to extend the pistons 52 and 54 and thus lower the actuator ring 32 which causes the radial tread segments 31 to open or, in other words, move radially outward to free the segments from the newly formed tire tread. The ram is then retracted.

The cross-beam 12 is then raised using the crank wheels 14 to strip the cured tire from the lower sidewall mold section 21. The cured tire is carried with the upper mold section, and they move upwardly and then laterally to the position shown in FIG. 1. The cylinder 85 is actuated to extend the cylinder 85 relative to the piston 88 to pivot the bell cranks 81 and extend the chuck arms 82 outwardly to define a diameter greater than the bead diameter. The ejector cylinders 71 and 73 are actuated to move the chuck assembly downwardly to strip the tire from the upper mold section. Finally, the ram is further retracted by moving the cylinder 85 upwardly to pivot the bell cranks 81 in the opposite direction and retract the chuck arms 82 so that the chuck mechanism disengages from the tire bead and the tire is released onto a conveyor, or the like.

With the center mechanism 40 thus shown and described, the operation of the segmented mold operating mechanism 50 is not effected by variations in fluid pressure, by improper alignment, or by other factors that effected performance in prior art devices, since the operating movement is accomplished by means of a central tube located around the mold axis and guided in a central bearing sleeve 67. The axially located bearing sleeve 67 absorbs any lateral loads and assures that the movement of the actuator ring 32 relative to the platen 34 is accomplished without tilting or variation in its position relative to the mold axis. Also, the operation of the ram/ejector mechanism 70 is retained at a central location about the mold axis, the mechanism being carried in piggyback fashion on the segmented mold operating mechanism 50. This arrangement greatly reduces operating failures caused by poor synchronization, unbalanced forces tilting, etc.

While the invention has been shown and described with respect to a specific embodiment thereof, this is intended for the purpose of illustration rather than limitation and other variations and modifications of the specific device herein shown and described will be apparent to those skilled in the art all with the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. An operating mechanism for a tire press that includes a fixed lower side wall mold, a movable upper side wall mold having a central axis and a segmented tread mold assembly, said molds and mold assembly having a closed position that defines a molding cavity, mold carrier means for moving said upper side wall mold and said segmented tread mold assembly from said closed position to an open tire discharge position and a forming bladder adapted to be inflated within an uncured tire carcass positioned within the molding cavity; said mechanism comprising:

bearing sleeve means coaxial with said central axis and fixedly mounted on said mold carrier means;

an outer tubular operating sleeve slidably received in said bearing sleeve means and extending therethrough, the outer sleeve having a lower end: said outer sleeve being operatively connected to said segmented tread mold assembly at the lower end thereof;

a plurality of first reciprocating drive means mounted on said mold carrier means and symmetrically spaced about said central axis;

crosshead means connected to all of said reciprocating means and adapted to be moved linearly thereby along said central axis, said crosshead means being operatively connected to said outer sleeve;

an elongated inner tubular operating member slidably received in said outer sleeve and extending therethrough;

a second reciprocating drive means mounted on said crosshead means and operatively connected to said inner member for moving said inner member relative to said outer tubular operating sleeve along said central axis;

another tubular sleeve slidably received within said tubular inner member, said other tubular sleeve being adapted, when extended downwardly along said central axis, to engage said forming bladder and force said bladder from the interior of a tire in said molding cavity;

fluid pressure means including fluid passage means within said other tubular sleeve, for moving said other sleeve axially within said tubular inner member;

chuck means operatively mounted on said lower end portion of said tubular inner member; and means mounted on the lower end of said other tubular sleeve and engageable with said chuck means for operating said chuck means in response to axial movement of said other tubular inner sleeve relative to said tubular inner member.

2. An operating mechanism as defined in claim 1, wherein said first reciprocating drive means comprise first fluid cylinder means with piston rods connected to said crosshead means.

3. An operating mechanism as defined in claim 2, wherein said second reciprocating drive means comprises a plurality of second fluid cylinder means symmetrically spaced about said central axis and with piston rods connected to a common connecting member, said connecting member being operatively connected to said inner operating member.

4. An operating mechanism as defined in claim 2, wherein said plurality of first fluid cylinder means comprises two fluid operated cylinder-piston units operatively connected to said crosshead means.

5. An operating mechanism as defined in claim 3, wherein said plurality of second fluid cylinder means comprises two fluid operated cylinder-piston units operatively connected to said connecting member.

6. An operating mechanism as defined in claim 1, wherein said chuck means is adapted for positioning along said central axis between the upper and lower side wall molds.

7. An operating mechanism as defined in claim 6, wherein said chuck means is operable to engage the bead portions of a tire from within the tire to strip the tire from one of said molds when said other tubular sleeve is moved in an axial direction.

8. An operating mechanism as defined in claim 1 wherein said other tubular sleeve comprises a fluid cylinder, and further including:

a central axial tube located within said tubular inner member and secured to said crosshead means, a piston mounted at the lower end of said central tube within said fluid cylinder, first passage means in said central tube for transmitting fluid pressure to said cylinder on one side of said piston to move said cylinder axially in one direction relative to said inner member, second passage means in said central tube for transmitting fluid pressure to said cylinder on the other side of said cylinder to move said cylinder axially in the other direction relative to said inner member.

* * * * *

UNITED STATES PATENT AND TRADEMARK OFFICE
CERTIFICATE OF CORRECTION

PATENT NO. : 5,466,140
DATED      : November 14, 1995
INVENTOR(S) : Donald C. Imler & Dirk A. Keller It is certified that error appears in the above-indentified patent and that said Letters Patent is hereby corrected as shown below:

```
Column 5, line 15, "234"
            should be --34--.
```

Signed and Sealed this

Fifth Day of March, 1996

Attest:

BRUCE LEHMAN

*Attesting Officer*     *Commissioner of Patents and Trademarks*